United States Patent
Rittenhouse

[15] 3,698,246
[45] Oct. 17, 1972

[54] THRUST PISTON FLUID METERS

[72] Inventor: Howard E. Rittenhouse, 919 South 19th Street, Rogers, Ark. 72756

[22] Filed: Sept. 24, 1971

[21] Appl. No.: 183,390

[52] U.S. Cl..............................................73/258, 418/49
[51] Int. Cl.......................................................G01f 3/12
[58] Field of Search..........................73/258; 418/49

[56] References Cited

UNITED STATES PATENTS

| 627,088 | 6/1899 | Bassett | 73/258 |
| 1,957,661 | 5/1934 | Miller | 73/258 |

Primary Examiner—Richard C. Queisser
Assistant Examiner—Herbert Goldstein
Attorney—George S. Schwind

[57] ABSTRACT

A thrust piston positioned in the ball portion of the disc of a nutating disc liquid measuring device whereby the said piston is actuated by incoming pressure to force the piston axially against a partition plate to counteract axial thrust imposed on the ball and disc and also absorb any side thrust by straddling the said plate. A modified embodiment utilizes a resilient means to actuate the thrust piston.

9 Claims, 5 Drawing Figures

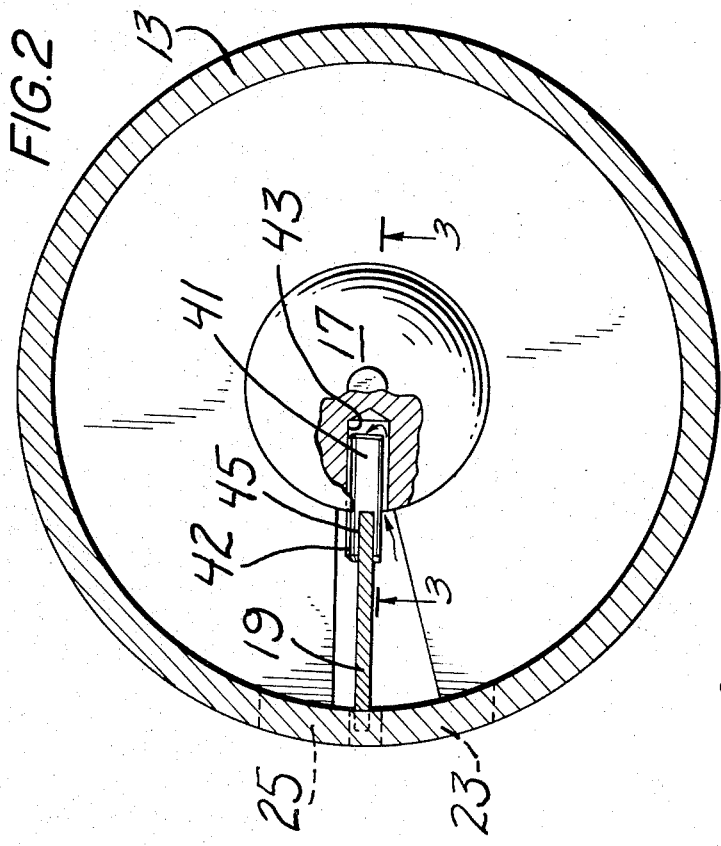
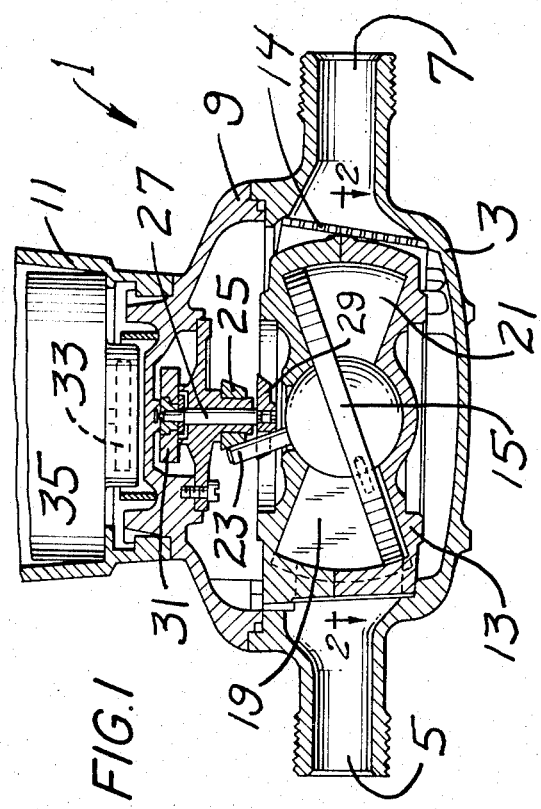
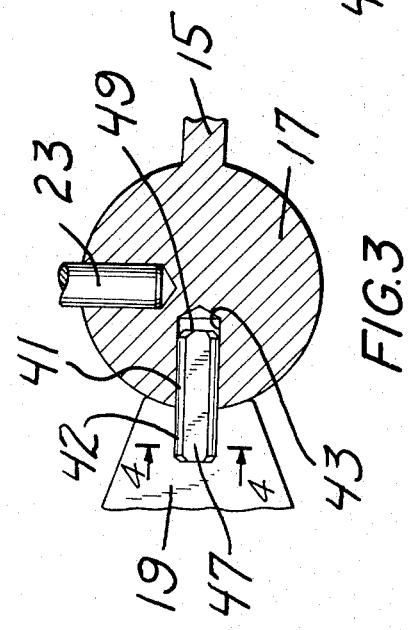
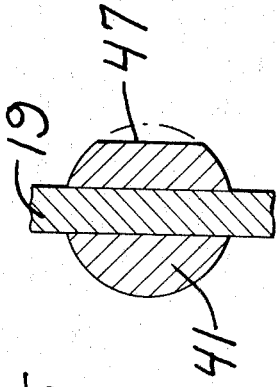
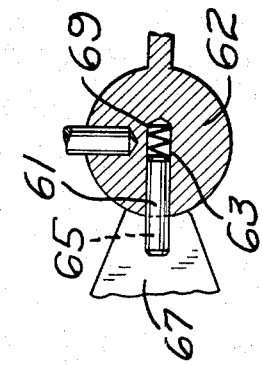

THRUST PISTON FLUID METERS

BACKGROUND AND PRIOR ART

This invention relates to fluid meters and in particular to improvements in thrust bearings in meters utilizing a nutating disc for measuring the flow of fluid through the metering chamber.

Fluid meters which utilize a nutating disc to measure the flow of fluid through the metering chamber in a well known manner whereby fluid passing through the metering chamber imparts a nutating motion to the disc which is converted in rotary motion to actuate a counter or register. The incoming fluid, under pressure, provides sufficient thrust to actuate the nutation of the disc. The disc is usually supported in a measuring chamber, which is constructed of two complementary sections which house said disc and form a measuring chamber. A partition plate in the measuring chamber separates the inlet from the outlet so that all fluid passing through the chamber is thus metered. The pressure and velocity of fluid entering the metering chamber impart considerable thrust on the nutating disc, which thrust is transmitted to the measuring chamber housing where contact between the two elements is maintained. This thrust caused by the fluid must be counteracted to insure accuracy and proper functioning of the meter. A common means of countering such thrust is the use of a thrust roller, which is positioned on the disc diametrically opposite the inlet of the measuring chamber, and is adapted to roll along a slot in the meter casing. Such slots utilize various types of bearing inserts which are placed in proximity to the roller to minimize wear and reduce friction, which would impede proper nutation of the disc. These inserts are replaceable and are of common use in nutating disc type metering devices which are used by many municipalities for metering water used by subscribers. Such thrust rollers and inserts have numerous drawbacks because they create a leakage path within a measuring chamber, wherein a high degree of accuracy is required. The complex machining of the internal portion of the measuring chamber to accommodate the thrust roller and bearing increases the cost of the meter. Because of the accuracy required to position such roller and bearing, it is also a source of problems in the assembly of meters. Such thrust roller arrangement also provides a bypass for the fluid passing through the metering chamber resulting in meter inaccuracy. Additionally, the slot which accommodates the removal bearing is of unconventional configuration since the movement of the thrust bearing in a disc which is nutating generates a complex arc which requires special tooling to produce. And, the replacement of bearing inserts for such slots is a time consuming and expensive operation which has been experienced with a high degree of difficulty in the industry. Numerous patents relating to thrust rollers and/or their respective bearing inserts have attempted to minimize the problem, as illustrated in U.S. Pats. Nos. 2,960,074 and 3,100,993.

It is the principal object of the instant invention to provide a novel thrust piston which will efficiently replace the conventional thrust roller commonly found on the nutating disc of such fluid meters.

Another object of the invention is to provide a thrust bearing for a nutating disc which is self-adjusting.

Still another object of the invention is to provide a thrust bearing for a nutating disc which provides reliable performance, is simple to replace, and which completely eliminates the necessity for intricate machining of the bearing slot required with conventional thrust rollers currently used in nutating disc chambers.

The instant invention replaces the conventional thrust roller which cooperates with a vertically extending slot in the disc chamber, or against wear plates removably mounted in side slots, by a thrust piston which is positioned in the ball portion of a nutating disc whereby the incoming fluid pressure forces the piston axially against the partition plate to counteract the axial forces normally absorbed by the thrust roller and in addition the said piston absorbs the side thrust as it straddles the usual partition plate associated with a metering chamber utilizing the nutating disc means of measuring fluid passing through a chamber.

These and other objects of the invention will become apparent from the following description when read in conjunction with the appended claims and accompanying drawings, wherein:

FIG. 1 is a vertical, sectional view of a water meter showing the internal construction of the metering casing and disc chamber;

FIG. 2 is an enlarged cross-sectional view through the metering chamber taken along line 2—2 of FIG. 1;

FIG. 3 is a partial cross-sectional view taken through the ball portion of the nutating disc through lines 3—3 of FIG. 2 showing the novel thrust piston and its relation to the ball and partition plate;

FIG. 4 is a partial enlarged cross-sectional view taken along line 4—4 of FIG. 3; and, FIG. 5 is a partial cross-sectional view, similar to FIG. 3, showing a modified embodiment of thrust piston, utilizing a resilient means to counteract thrust forces.

With reference to the drawings and in particular FIG. 1, a fluid meter, generally indicated at 1, has a lower housing 3 with inlet and outlet conduit connections 7 and 5, respectively. Upper housing 9, which extends from housing 3, has a register housing 11 extending therefrom, the latter housing being separated from the meter housings 3 and 9 in the usual manner to prevent fluid from entering housing 11.

Lower housing 3 has a measuring chamber 13 which is internally secured to the housing 3 by a sealing and locking taper on both the housing and chamber. Screen 14, functions as a filter to prevent foreign particles from entering the chamber. Chamber 13 contains a disc member 15, having an integral central ball portion 17 which supports the disc for its nutating action within the internal portion 21 of chamber 13 in a well known manner. Division plate 19, note FIG. 2, divides the internal portion 21 of chamber 13, to form a division wall between the inlet 23 and outlet 25 of said chamber. Inlet 23 and outlet 25 are in communication with inlet 5 and outlet 7, respectively, of housing 3.

As incoming fluid is admitted through conduit 7, it enters the inlet 23 of metering chamber 13. Disc 15 undergoes its well known nutating movement as fluid passes through the internal portion 21 of chamber 13 to meter the fluid. Disc 15 is provided with the usual drive spindle 23 which is secured to the ball 17, as shown.

Spindle 23 rotates around cone bearing 25 and transmits a rotary motion to drive shaft 27 by means of dog 29 which is secured to one end of shaft 27. The other end of shaft 27 has a magnet 31 affixed thereto whereby it transmits rotary motion to a second magnet 33 which is positioned in a sealed register housing 35 to form the usual magnetic coupling between the register and meter housings to provide a driving connection for the register 35, not shown. The register enables visual indication of the quantity of flow through the meter.

The above elements heretofore described are of well known construction and are identified to provide a background for the novel thrust piston which comprises the essence of the subject invention. With reference to FIG. 2, nutating disc 15 has a central ball or sphere portion 17 which provides a means of supporting said disc and enables the disc to function in its nutating manner. Partition plate 19, which separates the inlet 23 from the outlet 25 of measuring chamber 13, is secured to the said chamber so that there is no relative movement between the said partition plate and chamber.

Positioned in ball 17 is a piston 41 which is slideably received in a cylindrical bore 43 which extends toward the center of the said ball. One end of piston 41 is positioned in bore 43 and the other end has a slot 45 which enables the said piston to straddle partition plate 19, as clearly shown.

With reference to FIGS. 3 and 4, the piston 41 has an arcuate segment which has been removed along its axial length to provide a flat surface 47 on said piston. This flat surface 47 on the piston enables incoming fluid to be admitted into the bore 43 so that the fluid can act on the end portion 49 of piston 41 to urge the piston against the partition plate 19 and at the same time separate the ball portion from the said surface 49 to thereby function as a thrust piston. It is understood that there are other means which could be employed to enable fluid to be admitted into the bore 43 so that the fluid could act on end portion 49 of piston 47. Such means could include a separate hole drilled from the outside of the ball 17 to the bottom of bore 43, or, slotting the bore 43 along its side to admit incoming fluid. The primary intent in each instance being to allow the fluid into the cylindrical bore 43 so that it may act on the end portion 49 of said piston. Additionally, the side thrust that is created by the incoming pressure and velocity, which tends to rotate the nutating disc 15, will be absorbed by end portion 42 of the piston which extends beyond ball 17 and straddles the said partition plate 19. Thus, it is seen that the piston, because of its novel construction within the ball portion of the nutating disc and because of its straddling the partition plate, is capable of absorbing and counteracting the incoming pressure of the fluid which imposes both an axial thrust on the ball and tends to impose a side thrust to rotate the ball and disc. The piston absorbs these forces in a unique manner since it is actuated by the incoming fluid and eliminates the necessity for the utilization of the complex thrust roller and slot arrangement normally found on the side of the measuring chamber which is directly opposite the partition plate.

A modified form of thrust piston is shown in FIG. 5 wherein piston 61 is substantially circular in cross section and is slideably received in bore 63 which forms a blind hole within the ball 62. One end of the piston 61 is positioned in the bore and the other end has a slot 65 therein which enables the piston to straddle the partition plate 67, similar to the embodiment shown in FIGS. 2 and 3. Positioned within bore 63 adjacent the end of piston 61 is a resilient means 69, in the form of a spring or the like, which urges piston 61 into engagement with partition plate 67. Thus, the spring 69 provides the same function on the piston as the incoming fluid performed on the piston in the preferred embodiment described supra. The piston thereby absorbing both axial and side thrust on the ball in both embodiments.

From the above it is seen that the novel combination of piston, partition plate and ball portion of the nutating disc provides an improved structure for absorbing the thrust forces exerted on the nutating disc portion of a fluid meter which incorporates such disc and chamber as a means of measurement. The thrust piston disclosed herein, as noted, eliminates the necessity for the heretofore used thrust roller assembly which requires several components, including bearing surfaces and high tolerance machining.

Although the invention disclosed herein may be embodied in other forms without departing from the spirit and scope thereof, the preferred embodiment shown is considered illustrative and not restrictive.

I claim:

1. In a nutating disc fluid meter, the combination including:
    a. a measuring chamber having an inlet and outlet;
    b. a partition plate in said chamber separating said inlet from said outlet;
    c. a nutating disc positioned in said chamber including a ball portion supporting said disc for nutation, said ball portion having a cylindrical bore therein in proximity to said partition plate;
    d. a thrust piston slideably received in said bore, said piston contacting said partition plate; and,
    e. means to admit fluid into said bore to actuate said piston to thereby counteract axial and side thrust forces imposed on said disc by fluid flow through said chamber.

2. A fluid meter as claimed in claim 1 wherein one end of said piston extends from said bore, said one end having a slot therein adapted to receive said partition plate.

3. A fluid meter as claimed in claim 1 wherein said means to admit fluid into said bore comprises a recess formed along the length of said piston adjacent the inlet of said measuring chamber.

4. A fluid meter as claimed in claim 1 wherein said piston and said partition plate are in axial alignment.

5. In a fluid meter,
    a. a measuring chamber adapted to pass a fluid therethrough from an inlet to an outlet;
    b. a partition plate in said chamber separating said inlet from said outlet;
    c. a disc in said chamber adapted to be nutated by fluid;
    d. a ball portion supporting said disc in said chamber for nutation, said ball portion having cylindrical bore therein in alignment with said partition plate;

e. a thrust piston slideably received in said bore, said piston having an end portion extending from said bore adapted to straddle said partition plate; and, f. means to admit fluid into said bore to actuate said piston to thereby counteract the thrust forces imposed on said disc by fluid passing through said chamber.

6. A fluid meter as claimed in claim 5 wherein said means to admit fluid into said bore comprises a recess formed along the length of said piston adjacent the inlet of said measuring chamber.

7. In a fluid meter,
 a. a measuring chamber adapted to pass a fluid therethrough from an inlet to an outlet;
 b. a partition plate in said chamber separating said inlet from said outlet;
 c. a disc in said chamber adapted to be nutated by fluid;
 d. a ball portion supporting said disc in said chamber for nutation, said ball portion having cylindrical bore therein in alignment with said partition plate;
 e. a thrust piston slideably received in said bore, said piston having an end portion extending from said bore adapted to straddle said partition plate; and,
 f. means to actuate said piston to thereby counteract the thrust forces imposed on said disc.

8. A meter as claimed claim 7 wherein said means include fluid admitted into said bore adapted to urge said piston toward said partition plate.

9. A meter as claimed in claim 7 wherein said means include resilient means positioned in said bore adapted to urge said piston toward said partition plate.

* * * * *